United States Patent [19]

Klinkaü

[11] Patent Number: 4,490,321

[45] Date of Patent: Dec. 25, 1984

[54] METHOD AND APPARATUS FOR MANUFACTURING FILTER PLATES OR THE LIKE

[75] Inventor: Werner Klinkaü, Berg am Starnbergersee, Fed. Rep. of Germany

[73] Assignee: Klinkaü & Co. GmbH, Fed. Rep. of Germany

[21] Appl. No.: 450,344

[22] Filed: Dec. 16, 1982

[51] Int. Cl.³ .............................................. B29J 5/00
[52] U.S. Cl. ................................... 264/109; 210/231; 264/255; 264/267; 264/271.1; 264/325; 264/DIG. 48; 425/407; 425/411
[58] Field of Search .............. 264/109, 112, 126, 255, 264/266, 267, 271.1, 320, 325, DIG. 48, 249, 293, 252, 257, DIG. 7; 210/231; 425/407, 408, 411

[56] References Cited

U.S. PATENT DOCUMENTS

| | | | |
|---|---|---|---|
| 3,419,297 | 12/1968 | Diepenhurst | 264/249 |
| 3,534,343 | 10/1970 | Sallet | 264/255 |
| 4,154,893 | 5/1979 | Goldman | 264/325 |
| 4,164,527 | 8/1979 | Bakul et al. | 264/325 |
| 4,166,035 | 8/1979 | Ramsteck | 210/231 |
| 4,207,189 | 6/1980 | Geuenich | 210/231 |
| 4,240,780 | 12/1980 | Carcey | 425/407 |
| 4,332,847 | 6/1982 | Rawland | 264/293 |

FOREIGN PATENT DOCUMENTS 3001172 7/1981 Fed. Rep. of Germany.
3138857 4/1983 Fed. Rep. of Germany.

Primary Examiner—Jay H. Woo
Assistant Examiner—Michael McGurk
Attorney, Agent, or Firm—Hill, Van Santen, Steadman & Simpson

[57] ABSTRACT

A method and apparatus for manufacturing plates of thermoplastic synthetic material or the like by compression molding is disclosed, wherein a mold comprising a respective, horizontally, disposed upper and lower part is first filled with synthetic base material in granular form or the like, is subsequently heated while being pressure-charged and closed for the purpose of melting the synthetic base material. Finally, the mold is cooled in such a manner while being pressure-charged that the cooling essentially occurs from the horizontal mold surfaces, whereby, when manufacturing filter plates or the like exhibiting areas of unequal thickness, particularly a sealing rim and an essentially planar central area, a prefabricated core frame of solid synthetic material is provided which melts proceeding from its surfaces when the synthetic base material is melted is inserted into the mold into the area of the sealing rim or the like and whereby only the remainder of the synthetic base material is filled in the form of granular material or the like.

7 Claims, 9 Drawing Figures

METHOD AND APPARATUS FOR MANUFACTURING FILTER PLATES OR THE LIKE

BACKGROUND OF THE INVENTION

1. Field of the Invention

The present invention relates to a method for manufacturing plates consisting of thermoplastic synthetic material or the like by compression molding and to apparatus for practicing the method.

More specifically, a mold consisting of a respective horizontally-disposed upper portion and lower portion is first filled with synthetic base material in granule form or the like, is heated while being charged with pressure and closed for the purpose of melting the synthetic base material. Finally, the mold is cooled while being pressure-charged in such a manner that the cooling essentially occurs proceeding from the horizontal mold surfaces. As indicated above, the mold comprises a bipartite, heatable and coolable mold which is disposed essentially horizontally and whose upper portion and lower portion are movable relative to one another while being pressure-charged with controllable mold pressure in two stamp presses or the like respectively exhibiting essentially planar upper and bottom platens. The platens of the one press are only heatable and the platens of the other press are only coolable and the mold with the upper or lower portion is designed separate from the platens and is successively insertable into the hot press and into the cold press. A conveyor for introducing the mold filled with the synthetic base material into the hot press, for forwarding the same into the cold press after conclusion of the melting operation, and for delivery of the mold out of the cold press, is provided for execution of the corresponding steps of the method.

2. Description of the Prior Art

Filter plates of the type generally set forth above, which can be combined in groups to form the filter presses are usually manufactured of thermoplastic material. Heretofore, one has proceeded such that a heavy-duty press is employed, its upper and bottom platen being respectively designed as both a heatable and coolable lower portion and upper portion of the compression mold, whereby devices for heating the narrow sides of the filter plate to be manufactured during the cooling operation are additionally provided. The cavity of the mold is essentially completely filled with synthetic granular material such as polypropylene or the like. Given such a procedure, it is necessary to exert rather significant pressures on the synthetic material during the heating operation and, in particular, also during the cooling operation, such pressures being exerted with a structural expense for the presses caused by so doing since a warping of the filter plates or the like to be manufactured or, respectively, the occurrence of irregularities or bubbles could otherwise not be prevented. Such molding presses are not only expensive to manufacture, but the known methods are also very energy intensive, due to the fact that considerable masses must be heated and cooled whereby the counter-heating required during the cooling operation further produces an additional energy loss. Moreover, the channels for flow agent present in the bottom and upper platens of the presses must be designed such that they are suitable both for conducting a heating agent and then a cooling agent, so that a considerable structural expense results therefrom.

From the known German published application No. 30 01 172, fully incorporated herein by this reference, a method and apparatus of the type initially mentioned are provided wherein a mold frame limiting the filter plate to be manufactured is employed, the mold frame being later discarded, whereby flat insulating strips can be placed below the mold or, respectively, on the heating or cooling plate.

SUMMARY OF THE INVENTION

The object of the present invention is to improve the known method and the known apparatus to the effect that filter plates or the like can be manufactured with improved quality, with a considerably reduced energy consumption and material expense, and with an increased throughput.

In order to realize the above object, and according to the present invention, the method is improved such that when manufacturing filter plates or the like exhibiting areas of unequal thickness, particularly a sealing rim and an essentially planar central area, a prefabricated core frame of solid synthetic material melting proceeding from its surfaces when the synthetic base material is melted is introduced into the mold into the sealing rim area and only the remainder of the synthetic base material is filled in granular form.

A particular embodiment of the method provides that, when manufacturing a filter plate exhibiting material enlargements in the central area in the form of support studs or the like, prefabricated cores of solid synthetic material or the like are also inserted at the locations of such material enlargements.

In particular, it can be provided that the prefabricated cores are preformed in accordance with the outer contour of the filter plate to be manufactured at the place of insertion.

The initially mentioned generic method is also improved, according to the present invention, in that an edge strip of compressible, thermally insulating material whose height is essentially greater than the spacing of the mold portions before the beginning of the pressure charge is introduced into the mold, surrounding the synthetic base material to be melted.

Apparatus according to the present invention is characterized in that the mold portions exhibit a groove surrounding the sealing rim of the filter plate or the like to be manufactured, the groove being provided for the introduction of an edge strip consisting of thermally insulating, compressible material, such as wood, silicon, caoutchouc or the like.

It can thereby be provided that the mold portions are provided with aeration channels which respectively extend from the positions of material enlargements to be manufactured up to the narrow sides of the mold.

Apparatus constructed in accordance with the present invention can be further characterized in that a support track extending, in the open condition, at least over the longitudinal extent of the heating and cooling press and respectively projecting by at least one mold length at the tending side of each press is provided, and in that the mold exhibits support elements cooperating with the support track.

It can also be provided that the support rail comprises two rails extending at both sides of the apparatus outside of the press platens, running rollers or the like which are provided at least in pairs at both sides of the lower portion of each mold being engageable therewith.

A further embodiment of the invention provides that the running rollers can be lifted from the rails during the pressure charge of the mold in the heating and/or in the cooling operation of the press.

It can also be provided that, during the pressure charge of the mold in the heating and/or in the cooling operation of the press, the running rollers are liftable from the rails by way of a vertical motion of the bottom platen of the respective press.

Alternatively, the invention also provides that the support track exhibits roller rails provided in each of the bottom platens and exhibits extension members for these between the two presses as well as at the respective tending side thereof.

Again alternatively thereto, it can also be provided that the support track exhibits liftable ball races provided in each of the bottom platens and exhibits extension members for these races between the two presses as well as at the respective tending side thereof.

According to the invention, it is further proposed that a crane carriage or the like, movable from tending side-to-tending side and having a lifting device for conveying empty molds from the delivery side of the cooling press back to the filling station for the synthetic base material in front of the heating press is disposed above the presses.

It is characteristic of the invention that, first, the melting and cooling operations are, on the one hand, designed significantly more simple and more energy favorable in that prefabricated cores are employed or, respectively, the edge heating during the cooling operation which was previously viewed as being unavoidable is eliminated as set forth in greater detail below. It is further characteristic of the invention that, instead of the previously-provided, single molding press having both heatable and coolable molds rigidly connected to the press, two successively-disposed presses are employed, each being equipped with planar press platens. The platens of the one press, namely of the heating press, are thereby preferably electrically heatable, whereby the heating cartridges can be easily replaced in case of a defect, etc, as a result of the horizontal subdivision; whereas the press platens of the cooling press are simply coolable by way of water circulation. The mold parts of the invention are cast of a particularly hard aluminum alloy and are given their final form by way of a final metal cutting. The upper and lower portions are thereby respectively formed of one piece and, in cooperation with the material properties, consequently command excellent thermal conductivity which cannot be achieved given the assembly of mold parts from individual parts because of the intermediate grooves, etc, which are thereby unavoidable. The plastic creep of the synthetic material is likewise reliably prevented. The pressures to be applied, according to the present invention, are therefore significantly lower than in the previously known method, namely, both in the heating operation and in the cooling operation, since the material, while keeping the controllable pressure constant, is only "followed" i.e. a forced compression of the synthetic material does not occur. The mold parts are thereby designed such that they act self-adjusting due to guide pegs, etc, provided for this purpose, whereby considerable work savings again occur.

BRIEF DESCRIPTION OF THE DRAWINGS

Other objects, features and advantages of the invention, its organization, construction and mode of operation will be best understood from the following detailed description of preferred embodiments thereof, taken in conjunction with the accompanying drawings, on which.

DESCRIPTION OF THE PREFERRED EMBODIMENTS

Figure 2:
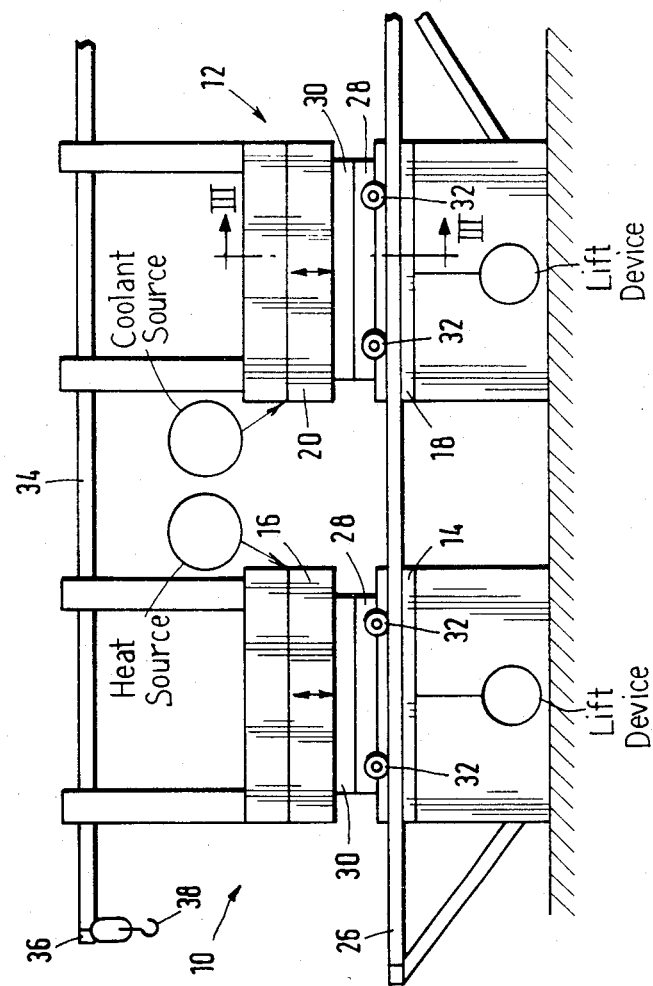
FIG. 2 is a side view of the device of FIG. 1.
Figure 1:
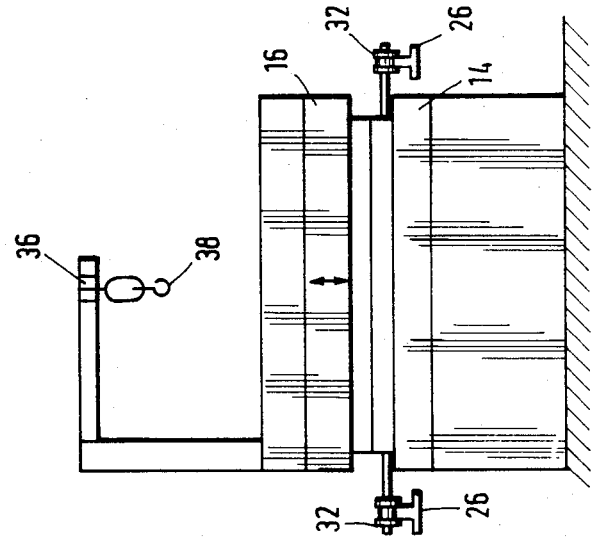
FIG. 1 is a front elevation of an exemplary embodiment of a device constructed in accordance with the present invention.
Figure 6:
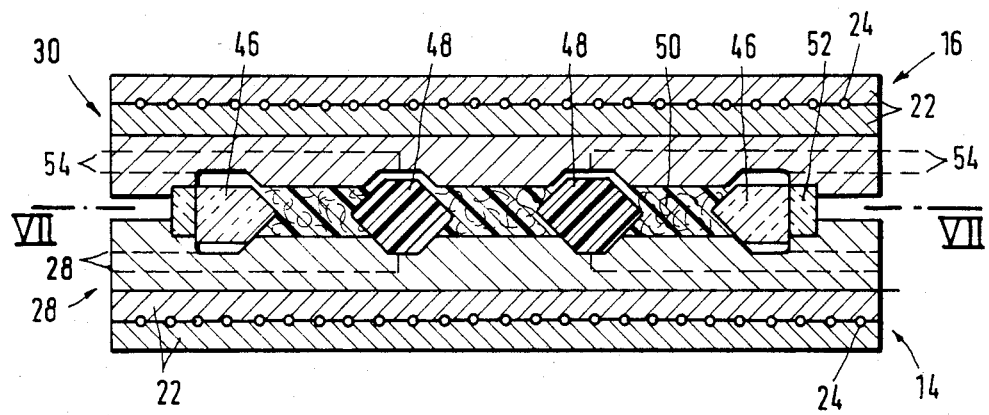
FIG. 6 is a sectional view of a mold constructed in accordance with the present invention and illustrated in a filled condition before the beginning of the compression molding operation.
Figure 7:
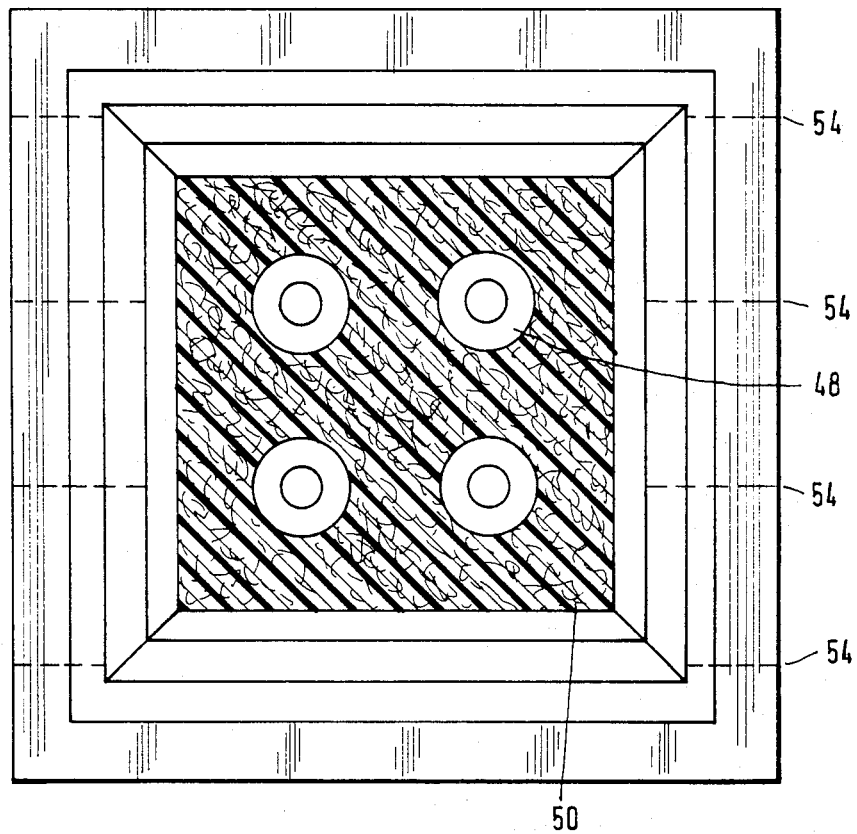
FIG. 7 is a sectional view of the mold of FIG. 6 taken generally along the parting line VII—VII of FIG. 6.

As the exemplary embodiment illustrated in FIGS. 1 and 2 shows, the apparatus of, and for practicing the method of the present invention, comprises a heating press 10 and a cooling press 12 whose lower and upper platens 14, 16, respectively are respectively heatable or coolable. As best seen in FIG. 6, the lower platen 14 and the upper platen 16 of the heating press 10 are subdivided into two platen parts 22 in whose parting plane channels 24 are formed in which electrical heating cartridges are placed, these being energized with heating current in a controlled manner. As indicated in FIGS. 1 and 2 by the arrows, the upper platens of the presses 10, 12 are vertically movable and, in particular, are movable with controllable pressure in the direction towards the bottom platens 14, 18. A respective rail 26 extends over the entire length of the presses 10, 12 at both sides thereof, whereby the rails project at the left side of the heating press 10 shown in FIG. 2 and to the right side of the cooling press 12 shown in FIG. 2 to such an extent that a mold comprising a bottom portion 28 and an upper portion 30 (see FIG. 6) which is supported on the rails by running rollers 32, provided in pairs at both sides of the mold, can be respectively disposed outside of the area of the press platens 14, 16, 18, 20.

A crane carriage 36 of an overhead crane is movable above the two presses 10, 12 along a track 34 such that the molds 28, 30 may be transported from one end to the other above the presses 10, 12 by way of a crane lifting device 38.

Figure 3:
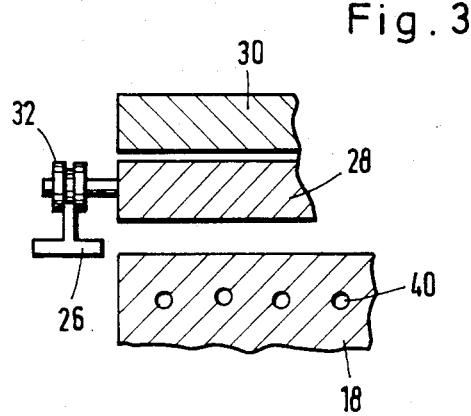
FIG. 3 is a fragmentary sectional view of a mold conveyor of the type of FIGS. 1 and 2 taken generally along the parting line III—III of FIG. 2.

Instead of the combination comprising a rail 26 and running rollers 32, which is again shown in greater detail in FIG. 3, the support track for the molds 28, 30

Figure 4:
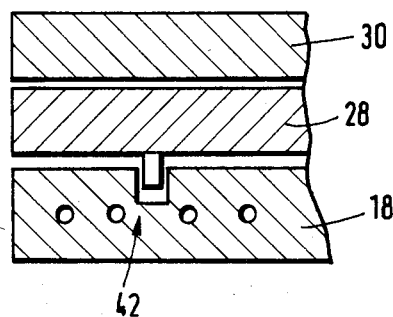
FIG. 4 is a fragmentary sectional view illustrating a modified embodiment of the structure illustrated in FIG. 3.
Figure 5:
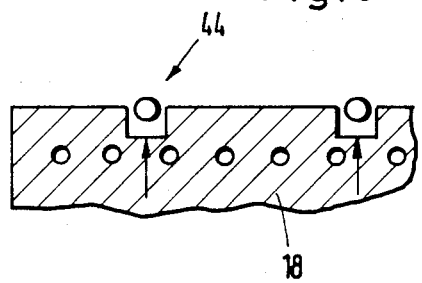
FIG. 5 is a fragmentary sectional view, again illustrating another modified exemplary embodiment of the structure illustrated in FIG. 3.

(in FIG. 3, as in FIGS. 4 and 5, the mold 28, 30 is respectively shown in the area of the cooling press 12, where it can be seen that the bottom platen 18 of the cooling press 12 like, moreover, the upper platen 20 as well, exhibits cooling channels 40 for coolant, particularly cooling water, to be conducted therethrough) extending over the entire length of the press combination and, as shown in FIG. 2, out into their tending zones can, as shown in FIG. 4, also comprise liftable roller conveyors 42 which are provided inside the bottom platen 18 of the cooling press and, of course, also inside the bottom platen 14 of the heating press in an analogous manner. In a modification of this exemplary embodiment, FIG. 5 shows liftable ball races 44 which, of course, are likewise again provided in both bottom platens 14, 18. In this case, connecting pieces or extension members are provided between the presses 10, 12 as well as in their introduction and delivery stations so that a continuous support track for the molds 28, 30 is guaranteed in the open press position. Transport of the molds on the support track can occur both manually as well as, for example, over carrier change or with the assistance of piston/cylinder units or the like.

As FIG. 6 illustrates, a core frame 46 prefabricated according to the outside contour to be manufactured, as well as support cores 48 of solid synthetic material, are introduced into the molds 28, 30 at those locations at which material enlargements are to be manufactured, namely, in the area of the sealing rim of the filter plate to be manufactured as well as where support studs are to be formed, whereas the remainder of the mold cavity is filled with synthetic granular material 50. The overall amount of filled synthetic material is thereby, of course, dimensioned such that the desired dimensions result after fabrication of the filter plate. Further, FIG. 6 illustrates an edge strip 52 surrounding the synthetic material and comprising thermally insulating material compressible under the mold pressure, namely, of silicon caoutchouc. Aeration channels 54 extend in the mold parts 28, 30 which are manufactured of aluminum, i.e. of a material exhibiting good thermal conductivity, from those locations at which material for enlargements is provided to the narrow sides of the mold.

Figure 8:
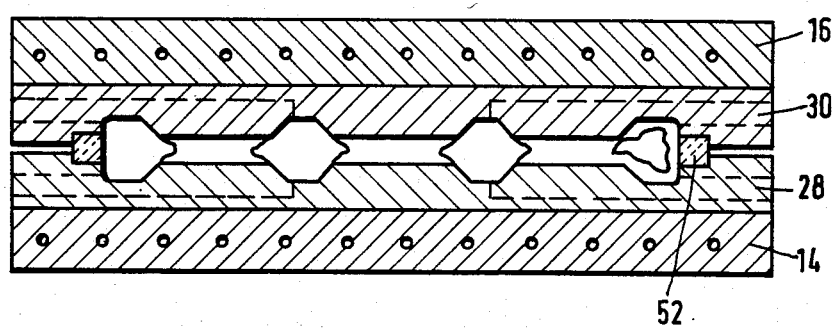
FIG. 8 is a sectional view, similar to that of FIG. 6, illustrating the mold at the conclusion of the melting operations.
Figure 9:
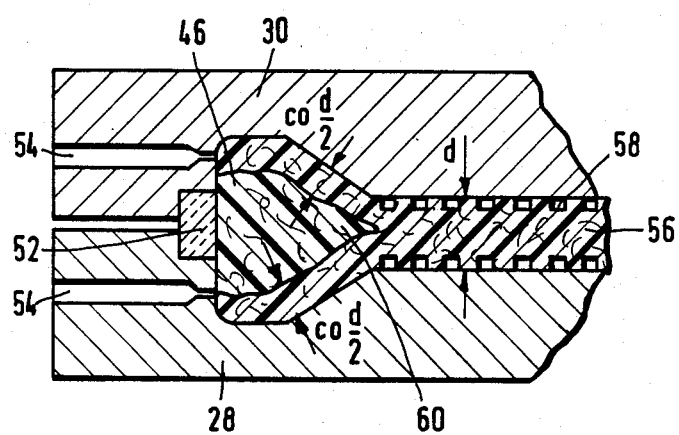
FIG. 9 is an enlarged fragmentary sectional view of the edge area of the mold illustrated in FIG. 8 at the conclusion of the melting operation.

FIG. 8 illustrates the mold of FIG. 6 after conclusion of the melting operation whereby, therefore, the mold parts 28, 30 moved towards one another under a constant pressure which is relatively slight practically press against one another and the sealing, compressible edge strip 52 of silicon caoutchouc has been greatly compressed. The detailed illustration of FIG. 9 shows that, in this condition, the melt 56 within the mold 28, 30 fills out the essentially planar central area in which the spacing studs 58 for attaching the filter cloth are formed in a known manner and, moreover, illustrates that the core frame 46 inserted in the edge area has melted proceeding from its surfaces, whereby, except for the side facing the edge strip 52, the thickness of d of the melt in the environment of the core frame 46 respectively amounts to approximately half the thickness of the central area of the filter plate to be manufactured. The apparatus of the invention described above operates as follows:

Upon insertion of the edge strip 52, a mold 28, 30 is first filled with the core frame and support cores to such a degree as illustrated in FIG. 6. In this condition, the mold which is provided with suitable guidance devices in the form of pegs, bores and the like provided at the upper and lower portions, these not being illustrated on the drawing, is put in place on the track 26 at the left as seen in FIG. 2. The mold is then introduced into the open heating press 10. Subsequently, the bottom platen 14 of the heating press 10 is lifted to such a degree that the running rollers 32 disengage from the transport track 26. Subsequently, the upper platen 16 of the heating press 10 is lowered and is seated with constant pressure against the upper portion 30 of the mold 28, 30. Upon constant pressure charging and simultaneous heating of the heating press 10 to the desired temperature, the melting of the synthetic material 50 then occurs, while melting the core frame 46 and support cores 48 until the condition shown in FIGS. 8 and 9 is achieved. The mold parts are then locked to one another. Subsequently, the heating press 10 is opened by raising the upper platen 16, the bottom platen 14 is lowered and the running rollers 32 again engage with the rails 26. Subsequently, the mold in FIG. 2 is conveyed over the rails 26 towards the right into the open cooling press 12. Analogously, following are the same steps as were explained with reference to the heating press 10, whereby, therefore, the two platens 18, 20 press again the mold parts 28, 30 with controllable, constant pressure during the cooling operation. The intensive contact of the material of the mold parts 28, 30 exhibiting good thermal conductivity therefore guarantees faultless thermal transfer to the mold parts 28, 30 both at the heating press 10 as well as at the cooling press 12 without the mold parts 28, 30 themselves requiring heating or cooling. Further, the edge strip 52 consisting of thermally insulating material prevents the filter plate from cooling off all too quickly in the cooling press 12 from its narrow sides so that, without employing lateral heating devices heretofore considered necessary, an optimally cooled, bubble-free product exhibiting no warping or irregularities can be achieved. Under certain conditions, the edge strip 52 can also be omitted since the inserted core frame 46 which, of course, itself consist of thermally insulating material, can itself assume the function of a thermal edge insulation in, for example, the manufacture of filter plates consisting of polypropylene. It is thereby preferably seen to, for example, by employing corresponding insulating edge strips in the mold parts, that the mold parts are less highly heated in the area of the inserted core frame 46 then in the central area so that the circumferential surface of the core frame can, in fact, efficiently assume a seal of the overall synthetic mass relative to the edge gap which unavoidably exists between the mold parts. Melting the core material proceeding from its surfaces assures an intimate connection to the granule material melt so that a mechanically stable product is obtained which is homogeneous. The use, moreover, of the core material considerably reduces the required melting and molding times, whereby noticeable energy savings are achieved in comparison to traditional methods. Given a cut through the finished plate, moreover, the non-melted area 60 of the filter plate can hardly be identified at all, the result thereof being that an intimate connection with the granular material melt 56 in fact occurs.

It should also be noted that the liftable roller rail illustrated in FIG. 4 or, respectively, the liftable roller conveyor illustrated in FIG. 5 is particularly suited for large-scale molds given which the use of a rail/running roller combination of the type illustrated in FIG. 3 could potentially entail problems because of the required dimensions.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method of manufacturing plates comprising a sealed edge and a planar central region from thermoplastic synthetic material by compression molding, in which the synthetic material is placed between upper and lower parts of a mold, heated under pressure in a press frame and then cooled such that cooling essentially occurs from the outer mold surfaces, the improvement therein for making plates having areas of unequal thickness, comprising the steps of:
   with an open mold, inserting a thermally-insulating compressible edge strip;
   inserting a prefabricated frame of solid synthetic material generally defining the periphery of the plate within the edge strip and between the upper and lower parts of the mold before heating under pressure;
   filling the remaining area of the mold with particles of the synthetic material; and
   closing the mold to engage the edge strip before heating under pressure and cooling under pressure.

2. The improved method of claim 1, for making plates having support studs therein, further comprising the step of:
   inserting prefabricated cores of the synthetic material between the upper and lower parts of the mold and within the frame prior to filling the remaining area with particles of the synthetic material.

3. The improved method of claim 2, further comprising the steps of:
   preforming the prefabricated elements in accordance with their desired final dimensions.

4. The improved method of claim 1, and further comprising the step of:
   prior to the step of inserting the edge strip, forming the thermally insulating edge strip, to be located between the upper and lower parts of the mold as an edge strip about the frame, with a thickness to provide a spacing between the mold parts prior to the application of pressure.

5. The improved method of claim 1, wherein:
   the step of heating is performed at a first work station; and
   the step of cooling is performed at a second work station.

6. A method of making plates comprising a sealed edge and a planar central region from thermoplastic synthetic material, comprising the steps of:
   with an open mold, inserting an edge strip of compressible thermally-insulating material in the mold to generally define the periphery of the sealed edge;
   inserting a prefabricated frame of thermoplastic synthetic material for a plate between upper and lower mold parts and within the edge strip;
   filling the remaining area wihtin the frame with particles of the thermoplastic synthetic material;
   closing the mold to engage the edge strip;
   transporting the mold to a first work station and inserting the mold between a first pair of platens;
   heating the mold while applying pressure thereto via the first pair of platens to melt the thermoplastic synthetic material;
   removing the mold from between the first pair of platens of the first work station;
   transporting the mold to a second work station and inserting the mold between a second pair of platens;
   cooling the mold while applying pressure thereto via the second pair of platens;
   removing the mold from between the second pair of platens of the second work station; and
   opening the mold and removing the molded plate from between the upper and lower parts of the mold.

7. The method of claim 6, and further comprising the step of:
   inserting prefabricated cores of the thermoplastic material within the frame prior to filling with particles of the thermoplastic synthetic material to form mounting studs in the plate.

* * * * *